(12) United States Patent
Connelly et al.

(10) Patent No.: US 10,928,544 B2
(45) Date of Patent: Feb. 23, 2021

(54) METHOD AND APPARATUS TO REDUCE RADIATION EMISSIONS ON A PARCEL SCANNING SYSTEM

(71) Applicant: Photo Diagnostic Systems, Inc., Boxborough, MA (US)

(72) Inventors: Benjamin Galen Connelly, Medford, MA (US); James Michael Connelly, Medford, MA (US); Bernard M. Gordon, Manchester, MA (US); Olof Johnson, Ashburnham, MA (US)

(73) Assignee: Photo Diagnostic Systems, Inc., Boxborough, MA (US)

( * ) Notice: Subject to any disclaimer, the term of this patent is extended or adjusted under 35 U.S.C. 154(b) by 0 days.

(21) Appl. No.: 16/178,821

(22) Filed: Nov. 2, 2018

(65) Prior Publication Data
US 2019/0129059 A1   May 2, 2019

Related U.S. Application Data

(60) Provisional application No. 62/580,917, filed on Nov. 2, 2017.

(51) Int. Cl.
*G01V 5/00* (2006.01)
*G01N 23/046* (2018.01)
(Continued)

(52) U.S. Cl.
CPC ........... *G01V 5/005* (2013.01); *G01N 23/046* (2013.01); *G01N 23/10* (2013.01); *G21F 3/00* (2013.01); *G01N 2223/3307* (2013.01)

(58) Field of Classification Search
CPC ..... G21F 3/00; G21F 5/14; G21F 7/00; G21F 7/005; G21F 7/047; G21F 7/06;
(Continued)

(56) References Cited

U.S. PATENT DOCUMENTS 3,980,889 A * 9/1976 Haas .................... G01V 5/0008
378/57
5,818,897 A    10/1998 Gordon
(Continued)

FOREIGN PATENT DOCUMENTS

JP    2005-241396 A    9/2005
JP    2012-159355 A    8/2012
(Continued)

OTHER PUBLICATIONS

International Search Report and Written Opinion dated Jan. 15, 2019 in connection with International Application No. PCT/US2018/058923.

*Primary Examiner* — Anastasia Midkiff
(74) *Attorney, Agent, or Firm* — Pandiscio & Pandiscio

(57) ABSTRACT

A scanning system includes an improved arrangement of shielding curtains to limit radiation leakage while achieving high throughput and limiting system length. The scanning system includes a segmented conveyor, including a faster conveyor through a shielding region to improve increase throughput of scanned articles, and a slower conveyor through a scanning region to ensure acceptable scanning performance. The curtains are arranged based on the changing gap distance between the articles that results from the changing conveyor speeds.

18 Claims, 8 Drawing Sheets

(51) Int. Cl.
*G21F 3/00* (2006.01)
*G01N 23/10* (2018.01)
(58) Field of Classification Search
CPC .... G21F 7/067; G01V 5/0008; G01V 5/0016;
G01V 5/005; G01N 23/02; G01N 23/04;
G01N 23/046; G01N 23/10; G01N
2223/03; G01N 2223/30; G01N 2223/33;
G01N 2223/3307; G01N 2223/40; G01N
2223/419; G01N 2223/639; G01N
2291/01; G01N 2291/011; G01N 2291/26
See application file for complete search history.

(56) References Cited

U.S. PATENT DOCUMENTS

| | | |
|---|---|---|
| 7,151,817 B1 | 12/2006 | Abraham et al. |
| 2005/0185757 A1 | 8/2005 | Kress et al. |
| 2007/0217571 A1 | 9/2007 | Teslyar et al. |
| 2009/0238336 A1 | 9/2009 | Akery |
| 2012/0160638 A1 | 6/2012 | Baker et al. |
| 2016/0372223 A1 | 12/2016 | Splinter et al. |
| 2017/0131428 A1 | 5/2017 | Langeveld et al. |
| 2017/0178759 A1 | 6/2017 | Forsythe et al. |

FOREIGN PATENT DOCUMENTS

| | | |
|---|---|---|
| JP | 2014-092410 A | 5/2014 |
| KR | 2016-0014760 A | 2/2016 |
| WO | WO 2012/035440 | 3/2012 |
| WO | WO 2015/114411 | 8/2015 |
| WO | WO 2015/155219 A1 | 10/2015 |
| WO | WO 2019/099980 | 5/2019 |

\* cited by examiner

METHOD AND APPARATUS TO REDUCE RADIATION EMISSIONS ON A PARCEL SCANNING SYSTEM

RELATED APPLICATIONS

This application claims priority under 35 U.S.C. § 119(e) to U.S. Provisional Application Ser. No. 62/580,917, titled "METHOD AND APPARATUS TO REDUCE RADIATION EMISSIONS ON A PARCEL SCANNING SYSTEM", filed on Nov. 2, 2017, which is herein incorporated by reference in its entirety.

BACKGROUND OF INVENTION

A radiation-based article inspection system may include radiation shielding. In some systems, rigid radiation shielding may be used to at least partially contain radiation. In a system inspecting a stream of articles, such as the case for an airport baggage scanner, rigid radiation shielding does not support the efficient ingress and egress of articles to be inspected. Curtains may be used such that articles are drawn through the curtains, passed through a radiation source, and then drawn out an exit. The curtains may decrease an amount of radiation escaping for a system scanning a steam of articles.

Some conventional x-ray projection based scanners, for example, those in use in airport since the 1970's, only need a few layers of radiation shielding to contain radiation. Additionally, in these older systems, shielding was often hung in 3 or so groups per entrance/exit. The number of layers used was based on the number needed to achieve the required radiation level in a static measurement, i.e., all layers down.

With the implementation of higher radiation producing CT imaging systems at the checkpoint, scrutiny of the radiation emission rate increased. Measurement of the emission rate while bags were being scanned at full speed became standard for some entities. As, newer, more capable, CT based scanners are coming into the market, e.g., in the 2017 timeframe, a greater challenge is presented. CT based scanners require a higher x-ray flux and generally cover a much larger area of detector. Therefore, the radiation released into the tunnel in systems employing CT based scanners has a higher intensity than in conventional projection systems and consequently more layers of radiation shielding are needed to contain the radiation.

BRIEF SUMMARY OF INVENTION

According to aspects of the present disclosure, there is provided a scanning system that includes an improved arrangement of shielding curtains. The arrangement of curtains can limit radiation leakage while achieving high throughput and a decreased system length. The scanning system includes a segmented conveyor, including a faster conveyor through a shielding region to improve increase throughput of scanned articles, and a slower conveyor through a scanning region to ensure acceptable scanning performance. The curtains are arranged with consideration given to a changing gap distance between the articles that results from the multiple conveyor speeds. Accordingly, the system can ensure that an appropriate number of shielding layers are deployed at any given time to achieve a desired shielding performance.

According to aspects of the present disclosure, there is a scanning system accommodating a radiation source. The scanning system comprises a plurality of curtains comprising a first pair of curtains having a first separation distance and a second pair of curtains having a second separation distance less than the first distance, the second pair of curtains being arranged more proximate to the radiation source than the first pair of curtains. The scanning system comprises a plurality of conveyors configured to move articles to be scanned past the plurality of curtains and past the radiation source. The plurality of conveyors comprises a first conveyor configured to move the articles at a first speed and a second conveyor. The second conveyor is configured to receive the articles after the articles are moved by the first conveyor and move the articles at a second speed different than the first speed.

In some embodiments, the plurality of conveyors are configured to move articles first past the first pair of curtains and then past the second pair of curtains and the second speed is less than the first speed.

In some embodiments, the first conveyor is arranged at least partially in a shielding region and the second conveyor is configured to move the article through an imaging region formed at least in part by the radiation source.

In some embodiments, the plurality of conveyors are configured to move articles first past the second pair of curtains and then past the first pair of curtains and the first speed is less than the second speed.

In some embodiments, the second conveyor is arranged at least partially in a shielding region and the first conveyor is configured to move the article through an imaging region formed at least in part by the radiation source.

In some embodiments, the first pair of curtains are constructed and arranged with the first separation distance, the second pair of curtains are constructed and arranged with the second separation distance, and the first separation distance added with the second separation distance added with a drop distance is less than a gap between a first article and a second article of the articles to be scanned.

In some embodiments, there is a first number of curtains to be in a down position at all times and the plurality of curtains comprises a first set of curtains. The first set of curtains comprises a second number of curtains that is equal to the first number of curtains, a first curtain, and a final curtain. The plurality of curtains comprises a curtain following the final curtain of the set of curtains. A separation distance between the first and final curtains, added with a separation distance between the final curtain and the following curtain, added with a drop distance is less than a gap between a first article and a second article of the articles to be scanned.

In some embodiments, for articles having a length of at least substantially 26 inches, arranged at an initial gap distance of at least substantially 26 inches, at least two curtains of the plurality of curtains are arranged in a deployed position at all times, and the plurality of curtains comprises a first curtain and a final curtain arranged about 40 inches apart.

In some embodiments, the scanning system is configured to scan at least about 600 articles per hour.

In some embodiments, the first pair of curtains comprises a first curtain and a second curtain and the second pair of curtains comprises the second curtain and a third curtain. In some embodiments, two pairs of curtains may comprise three curtains.

In some embodiments, the first pair of curtains comprises a first curtain and a second curtain and the second pair of curtains includes a third curtain and a fourth curtain. In some embodiments, two pairs of curtains may comprise four curtains.

In some embodiments, the first pair of curtains comprises a first curtain, the second pair of curtains comprises a second curtain disposed between the first curtain and the radiation source, and the second curtain comprises a single layer of shielding and the first curtain comprises a double layer of shielding.

In some embodiments, the plurality of curtains further comprises a third curtain, a fourth curtain, a fifth curtain and the first curtain, the second curtain, the third curtain, the fourth curtain, and the fifth curtain are arranged sequentially along the plurality of conveyors.

In some embodiments, the scanning system further comprises a third pair of curtains and a fourth pair of curtains, and the plurality of conveyors are configured to move the articles sequentially past the first, second, third, and fourth pairs of curtains. The third pair of curtains have a third separation distance, the fourth pair of curtains have a fourth separation distance, the third separation distance is less than or equal to the second separation distance, and the fourth separation distance is greater than the third separation distance.

In some embodiments, the scanning system further comprises the radiation source, the radiation source comprising an emitter, and a detector, the emitter and detector being configured to scan articles.

According to aspects of the present disclosure, there is a method of scanning a plurality of articles. The method comprises moving a first article and a second article, separated by a first article gap, past a first pair of curtains having a first separation distance, and moving the first article and the second article, separated by a second article gap less than the first article gap, past a second pair of curtains having a second separation distance less than the first separation distance.

In some embodiments, the first pair of curtains are constructed and arranged with the first separation distance, the second pair of curtains are constructed and arranged with the second separation distance, and the first separation distance added with the second separation distance added with a drop distance is less than an article gap.

In some embodiments, the method of claim further comprises scanning the first article in an imaging region formed at least in part by a radiation source.

In some embodiments, the articles have a length of at least substantially 26 inches and the first article gap is at least substantially 26 inches, and the method further comprises maintaining at least two curtains in a deployed position at all times, and a first curtain and a final curtain being arranged about 40 inches apart.

According to aspects of the present disclosure, there is a method of manufacture of a scanning system. The method comprises the steps of, arranging a first pair of curtains to have a first separation distance and a second pair of curtains to have a second separation distance less than the first distance, arranging the first and second pairs of curtains so that the second pair of curtains more proximate to a radiation source than the first pair of curtains, and arranging the first and second pairs of curtains above a plurality of conveyors configured to move articles to be scanned past the first and second pairs of curtains and past the radiation source, the plurality of conveyors comprising a first conveyor configured to move the articles at a first speed and a second conveyor configured to receive the articles after the articles are moved by the first conveyor and move the articles at a second speed different than the first speed.

DETAILED DESCRIPTION OF INVENTION

Figure 1:
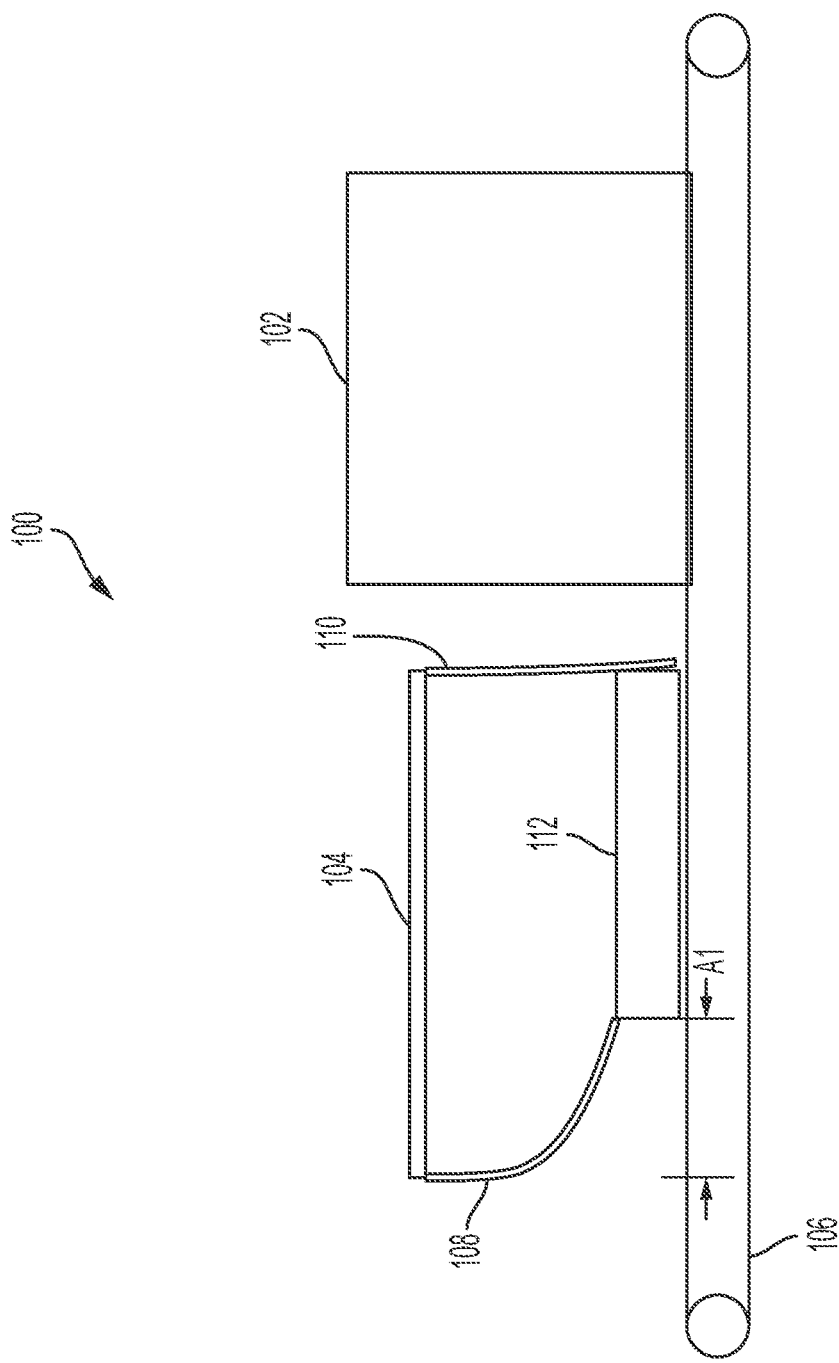
FIG. 1 is a side view of a scanning system, according to one aspect.

According to aspects of the present disclosure, a radiation-based article inspection system includes radiation shielding which is designed to allow the efficient throughput of articles through the system. Aspects of the present disclosure present a method for improving or optimizing disposition of curtains within a scanning system to limit radiation leakage while achieving high throughput and limiting system length.

In some embodiments, a scanning system accommodates a CT based or other higher intensity radiation source, having increased intensity of radiation compared to conventional projection x-ray based scanning systems. As such, unacceptable radiation levels can escape through or around an article as it pushes open a curtain as the article is drawn through the curtain. Therefore, having the curtains all in one place like in many conventional implementations is unacceptable. For example, when all curtains are located at one position, a single article passing the curtains can hold open each curtain and ensure that no curtains are arranged in a down position to block radiation.

In some embodiments, it may be ensured that enough curtains are in a down position at all times by providing the stream of articles to be scanned with an adequate gap between the articles as they move through the system such that two or more curtains of a group of curtains are always in a down position as the articles pass through the system. In some embodiments, the scanning system is constructed and arranged to provide adequate shielding even with higher powered CT scanning, for example by providing two or more curtains configured to maintain a down position at all times items are transitioned through the system. In various examples, a down position of a curtain may be referred to as a deployed position. In other examples, a curtain not in a down position may be referred to as in a non-deployed position.

In some embodiments, there is a relationship between throughput of articles and shielding of radiation. The inventors have recognized and appreciated that to increase the number of articles passing through an inspection system, the separation between articles may be decreased. The inventors have further recognized and appreciated that if articles are close together (e.g., spaced by gaps having a magnitude on the order of the drop length or less) then a stream of articles may hold all of the curtains in an open position regardless of a distance between a first curtain and a last curtain. This situation allows the radiation an escape path through articles holding the curtains in an open position, with the result that an emission rate may exceed an acceptable level.

The inventors have recognized and appreciated that it is desirable to maintain throughput of articles while also benefiting from the greater radiation shielding provided by arranging a stream of articles with large gaps. According to some embodiments, articles are conveyed at different speeds in different zones within a scanning system. In further embodiments, the system is configured to convey objects to be scanned at a plurality of speeds maximizing shielding performance with a desired throughput. Various embodiments implementing differential conveyer speeds achieve significant improvement in throughput while preserving desire shielding relative to conventional approaches. Yet other embodiments significantly increase shielding capability relative to conventional approaches.

The inventors have further recognized and appreciated that a gap size (e.g., spacing between articles) required to ensure that a desired number of curtains are arranged in a down position is independent from a speed at which the articles are conveyed. For example, if the stream of articles is conveyed at a faster speed, a desired throughput may be achieved while maintaining the desired gap (the gap being tied to the resulting shielding performance).

In some embodiments of the present application, there is provided a segmented conveyor system, such that the scanning section of the conveyor is run at the required speed, and the sections corresponding to the shielding are run at some faster speed. Such a segmented conveyor system can be configured to allow for the large gaps between articles needed while going through shielding, and the smaller gaps between bags during scanning desirable for throughput.

some embodiments, imaging performance of a system is at least partially based on conveyance speed of the articles through a scanning region. In some examples, a conveyor passing through a scanning region may be referred to as a scanner or imaging conveyor. In some embodiments, a scanning conveyor can have a maximum speed set or enforced which corresponds to the fastest speed at which a desired scanning performance is achieved. Thus, in various embodiments, the system ensures that the scanning conveyor cannot arbitrarily be run faster than the maximum speed for a desired scanning performance.

According to one embodiment gaps between articles may be reduced during operation of the scanning system. For example, spacing between articles can be reduced proportionally as the articles transition from a first segment to a slower scanner segment or conveyor. In some examples, the transition between fast segment to slow segment is configured to provide a desired imaging quality based on an amount of time needed for a target image quality. According to some embodiments, such a system is configured to achieve a higher throughput while controlling radiation when compared to similar systems not having a segmented conveyor system. In some examples, the segmented conveyor system can include physically longer conveyor elements.

In some embodiments, a first conveyor in the system may comprise a feed conveyor. A feed conveyor may be the conveyor which receives articles to be scanned, for example, from an user. Article spacing may be set as articles are loaded onto a conveyor.

In some embodiments, a conveyor may be segmented to separate a shielding region, which may include the curtains, from an imaging region. The imaging region may be formed by a radiation source accommodated by the scanning system. In various embodiments, a shielding conveyor can be included in a shielding region. In some examples, the shielding conveyor may be run at a faster speed than an imaging conveyor (e.g., that is included in an imaging region of the system). A stream of articles passing through such an arrangement of conveyors will generally start on the shielding conveyor having a gap size which is appropriate for shielding (e.g., limiting radiation emissions). In operation of various embodiments, as a first article of the stream transfers to the slower segment (e.g., the imaging conveyor), the gap between the first article and a second, following article of the stream will decrease until the second article is also on the second conveyor. The resulting gap may be predicted based on the speed ratio of the two conveyors, the length of the articles, and the initial gap length. Each article is imaged at the slower, imaging conveyor speed, and then is re-accelerated as it is transferred onto a third conveyor which is an exit conveyor. The articles pass through the additional curtains on the exit conveyor.

In conventional systems, shielding placement is ad hoc, and layers of shielding are grouped at several locations within a tunnel to decrease radiation leakage when the system is generating x-rays. However, in these conventional systems, consideration is not given to a case where the system is scanning a stream of articles.

According to aspects of the present disclosure, there is a method for improving or optimizing disposition of shielding within a system. In some embodiments, the shielding is radiation shielding, for example, curtains. The method of optimizing disposition of shielding within a system is configured to limit radiation leakage while achieving high throughput and, in further example, the method can also be configured to limit a required system length while maintaining the high throughput and radiation leakage.

According to aspects of the present disclosure, the distribution of radiation shielding in a radiation-based article inspection system is not uniform. In some embodiments, the distribution of radiation shielding is set based at least in part on a changing gap between articles as the articles are moved through the system. The changing gap may be a result of the articles being moved by at least two conveyors having different speeds.

The present disclosure presents an improvement over a conventional system, including for example, over conventional systems having uniform spatial distribution of curtains within a tunnel. In some embodiments, the physical locations of radiation shielding are set in consideration of a decreasing gap between two articles as the two articles progress through the system and change speeds relative to each other. In some embodiments, the system allows improved throughput due to differing conveyor speeds, while also decreasing an overall size (e.g., length) of the system, particularly limiting entrance and exit tunnel length.

In some embodiments, relative position of articles disposed on the plurality of conveyors may be adjusted, which can provide improved shielding performance. This may be achieved by use of one or more sensors, one or more mechanical devices, and/or by adjusting conveyor speed.

In some embodiments, one or more sensors are configured to sense the positions of articles on a plurality of conveyors. The sensors may be configured to, alone or in conjunction with at least one processor, determine relative positions of a plurality of articles in the stream of articles. For example, the sensors may comprise one or more cameras arranged at one or more positions along the conveyors, one or more mechanical sensors (e.g., switches at a curtain mounting position activated as an article moves past and displaces a curtain), or other sensors which may be used to determine positions of articles.

[Information determined or provided by the one or more sensors may be used to cause one or more corrective actions. For example, the scanning system may comprise one or more mechanical devices configured to change a relative position of an article relative to an underlying conveyor. In some embodiments, a mechanical device pushes or lifts and moves an article opposite the direction of motion of a conveyor. The mechanical device, by adjusting the position of the article relative to the conveyor, changes article gap distance. Changing the article gap distance by the mechanical device can allow a determined required gap distance to be maintained.

In some embodiments, the effect of multiple conveyors may be imitated by a mechanical device. For example, when a leading article and a following article are moved by at least one conveyor, a mechanical arm can insert itself between the articles by move in front of the following article as it is being moved by the at least one conveyor. The arm holds the following bag at a fixed location while the leading article continues to be moved by the at least one conveyor, increasing the gap between the articles. In this manner, the gap between articles is adjusted.

Alternatively or additionally, information determined by the one or more sensors may be provided to a user by a display. The user may the manually perform a corrective action (e.g., adjusting gap distance) or provide an instruction to the scanning system to perform the action.

In some embodiments, information determined or provided by the one or more sensors may be used to adjust the speed of one or more conveyors. Upon sensing that an article gap distance is smaller or larger than a determined required gap distance, a faster, shielding conveyor may change speed, or the slower, scanning conveyor may change speed. By adjusting a speed ratio between the shielding and scanning conveyors, the rate of change of gap distance as articles move through the system may be altered. For example, decreasing a speed of an entrance shielding conveyor can increase the gap size of articles. In some embodiments upon detection of an unsuitable gap length, the shielding conveyor may decrease its speed to match the speed of the scanning conveyor such that an initial gap length is maintained and does not decrease through the system.

In some embodiments, a scanning system may adjust article movement and/or spacing to account for user review time. For example, a leading article may be stopped on an exit conveyor and/or in an exit tunnel, just before it lifts an outermost exit curtain. The leading article may be stopped to allow a following article to finish scanning and stop just before an innermost exit curtain. When the leading article and the following article are disposed in this holding position, the gap between them is too small to ensure a sufficient curtains will be down at all times. However, the innermost and outermost exit curtains are down. In this arrangement, the leading article may be disposed on an exit conveyor and the following article may still be disposed on a scanning conveyor, yet to be transferred to the exit conveyor. A user may then remove an article off the outer queue. The exit conveyor is started and the scanner conveyor is held until the gap between the leading article and the following article is re-established to a determined required gap. The scanner conveyor may then resume motion.

It should be appreciated that the above mechanical devices, user actions, conveyor speed, and/or other article position adjustments may also be applied in a case where an article gap is larger than a determined required gap length, in order to reduce spacing and therefore increase article throughput, and may be applied to a scanner entrance and/or exit.

In some embodiments, layers of radiation shielding may be split between a plurality of positions. For example, a first curtain may be disposed at an outer end of a tunnel, and a second curtain may be disposed at position within the tunnel. Given sufficient spacing relative to article size and spacing, such an arrangement may ensure that the first curtains fall back in place before the second curtains in the series are pushed out of the way. The first curtains will fall in place before the second curtains are pushed out of the way as long as the article length and the drop length are taken into account.

In some embodiments, the number of groups of shielding is increased while the number of layers of shielding in each group is reduced to 1 or 2 layers and distributing these groups throughout the non-scanning part of the tunnel has been implemented to reduce the probability that a stream of articles could hold all the curtains open at once. Combined with a large gap between articles, this approach resulted in adequate radiation control, at the expense of a significant reduction to system throughput.

Curtains may be used to decrease the amount of radiation which escapes. In some embodiments, other arrangements of radiation shielding may be substituted for or used in addition to curtains. For example, there may be flexible shielding layers. In some embodiments curtains or flexible radiation shielding materials may comprise lead contained in a vinyl matrix. Panels of this leaded vinyl (often called leaded curtains) are slit and hung over a conveyor belt inside a rigidly leaded tunnel.

In some embodiments of the present application, shielding layers are arranged as hinged curtains and/or separate strips to minimize a resistance to lightweight articles passing through the system.

In some embodiments, a curtain comprises a set of flexible shielding comprising one or more layers of shielding. In various embodiments, a curtain may comprise one, two, three, or more layers or shielding. According to some embodiments, a curtain may comprise at least a first layer of shielding, for example, a double layer of shielding. A double layer of shielding in a curtain may refer to double that of a layer of shielding in another curtain in the same system For example, a single system may include some curtains including a double layer of shielding and other curtains including a single layer of shielding.

In some applications, it is necessary to transfer lightweight articles through a scanning system. Lightweight articles may slip on a conveyor due to a curtain, rather than passing through the curtain, for example in a case where a curtain comprises multiple layers of leaded curtains. In some embodiments, curtains may be distributed throughout a tunnel, such that an article is only hitting one or two layers at a time. According to various embodiments, this construction and arrangement is configured to decrease forces exerted on articles and allow them to pass through the curtains freely.

Drop length is the distance the tail of an article must pass beyond a curtain position before the curtain falls off the article and drops back into an unperturbed position. Drop length depends on the length and stiffness of the curtain and on the type of article. Drop length may be determined experimentally. In some embodiments, a drop length may comprise a mean drop length in a case where there is variation in drop lengths based on features of the articles, or based on other factors. FIG. 1 shows an exemplary drop length A1.

In some embodiments, each curtain is arranged at a respective position along a first axis. Each curtain may be configured such that before a front end of an article reaches the position of the curtain, the curtain is arranged in a deployed position. Each curtain may be configured such that after a leading edge of the article reaches the position of the curtain, the curtain is arranged in a non-deployed position. Each curtain may be configured such that after a trailing edge of the article passes the position of the curtain, the curtain remains arranged in a non-deployed position. Each curtain may be configured such that after the trailing edge of the article passes a drop length from the position of the curtain, the curtain returns to a deployed position.

System length may be defined along a conveying direction, which is the direction along which the conveyor moves articles. In some embodiments system length may inhibit where a particular scanning system may be installed.

In some embodiments, a shielding region may include sets of curtains. In various embodiments, a curtain set may include one, two, three, or more curtains, the sets forming pairs, trios, etc. of curtains. Curtains sets may be arranged as consecutive sets of curtains, along a direction of travel of an article on the at least one conveyor. A next consecutive curtain, along the direction of travel, may be a following curtain.

For example, in an embodiment where each set is formed of three curtains and a scanning region includes first, second, third, fourth, and fifth curtains, there may be three sets of curtains. The first, second, and third curtains may form a first set of curtains. The second, third, and fourth curtains may form a second set of curtains, which is consecutive to the first set. The third, fourth, and fifth curtains may form a third set of curtains, which is consecutive to the second set. As should be appreciated, arrangements of consecutive sets of curtains are not limited to sets of three curtains, and can apply to any set of curtains, such as two sets of curtains.

The inventors have recognized and appreciated that arrangements of curtain sets, in conjunction with article drop length and article spacing, can determine a minimum number of curtains that are disposed in a down position at all times as a stream of articles passes through a scanning system. According to aspects of the present application, each set of curtains may include the number of curtains that is the number of layers of shielding desired to be arranged in a down position at all times.

For example, in some embodiments, two layers of shielding may be desired to be in a down position at all times. In that case, each set of curtains may comprise two curtains forming a pair of curtains. In other embodiments, three or more layers of shielding may be desired to be in a down position at all times. In that case, a set of curtains may comprise the three or more curtains forming a trio, etc. of curtains.

Based on a conveyor speed ratio between a shielding conveyor and a scanning conveyor, along with an initial article gap, the article gap as a function of position along the conveyor is known. Using the conveyor speed ratio, along with typical article size and typical drop length, the article spacing and curtain set spacing may be arranged to reduce radiation escapade.

According to aspects of the current disclosure, a distance between a first curtain of a first set and the final curtain of the next consecutive set, added with a drop distance of a typical article is less than an instant article to article spacing.

In the case where a leading article and a following article pass a set of curtains, the instant article spacing is the spacing between the articles at the moment that the following article is about to contact the first curtain of the first set. This arrangement may be applied to spacing of curtains within sets for each curtain articles pass as they progress along the conveyor. Thus, the spacing of curtains within each set of curtains may meet be formed according to the above arrangement. As a result, of changing article spacing throughout the system, the curtain separation also changes. As article spacing decreases, so will curtain separation. As article spacing increases, so will curtain separation This arrangement ensures that the required number of layers, i.e., the number forming a set, will be down at all times.

For example, when two layers of shielding are desired to be down at all times, sets of curtains may comprise two curtains arranged in a pair. In this case, two consecutive sets of curtains comprise two consecutive pairs of curtains, comprising a first, second, and third curtain. In this case, for each group of two consecutive pairs, the spacing between the first and second curtain, added with the spacing between the second and third curtain, added with a typical drop length, may be less than an instant article spacing. As described above, this arrangement may be applied for all sets of curtains through the shielding region.

Similarly, in an example when three layers of shielding are desired to be down at all times, sets of curtains may comprise three curtains arranged in a trio. In this case, two consecutive sets of curtains comprise two consecutive trios of curtains, comprising a first, second, third, and forth curtain. In this case, for each group of two consecutive trios, the spacing between the first and second curtain, added with the spacing between the second and third curtain, added with the spacing between the third and fourth curtain, added with a typical drop length, may be less than an instant article spacing. Because the instant article spacing is larger than the spacing between the first and second curtain, added with the spacing between the second and third curtain, added with the spacing between the third and fourth curtain, added with a typical drop length, when the spacing between articles is non-zero, the instant article spacing is also larger than the spacing between the first and second curtain, added with the spacing between the second and third curtain, added with a typical drop length. This arrangement may be applied for all sets of curtains through the shielding region.

As should be appreciated, these arrangement s are not limited to sets of two or three curtains, and can apply to any set of two or more curtains. Arranging a plurality of curtains in a shielding region according to the above may result in a generally decreasing spacing between curtains as article spacing decreases.

The curtains of a curtain set, such as a pair or trio, can be arranged spaced along an a conveyor. Curtains of a curtain set or a curtain pair may be arranged at a separation distance. The separation distance of a two curtains of a set or pair may form a gap, free of curtains. Such a gap may be filled by an ambient, such as air or another medium in which the scanning system is disposed. Alternatively, a distance may be formed between two non-consecutive curtains, i.e., curtains having one or more curtains disposed therebetween.

In some embodiments, each curtain of a pair of curtains is independently deflectable. That is to say, an article that has reached and deflects the first curtain will not also deflect the curtain, until the article further travels the separation distance and reaches the second curtain.

The items to be scanned by the scanning system may comprise various articles, as the present disclosure is not limited in the items to be scanned. For example, scanned articles may comprise bags, packages, parcels, palletized items, or other articles.

FIG. 1 shows an exemplary embodiment of a scanning system 100. The scanning system 100 of FIG. 1 comprises a shielding region 104 adjacent a radiation control area 102. An article 112 is moved by a conveyor 106 through the shielding region 104 to the radiation control area 102. The shielding region 104 comprises an arrangement of curtains 108 and 110 that ensures that at least one curtain will always be down. The curtain arrangement of FIG. 1 may prevent one article from holding all curtains open. While this arrangement ensures that at least one curtain is arranged in a down position at all times, the inventors have recognized and appreciated that it may be desirable to provide additional radiation shielding by ensuring that at least two curtains are arranged in a down position at all times.

Figure 2:
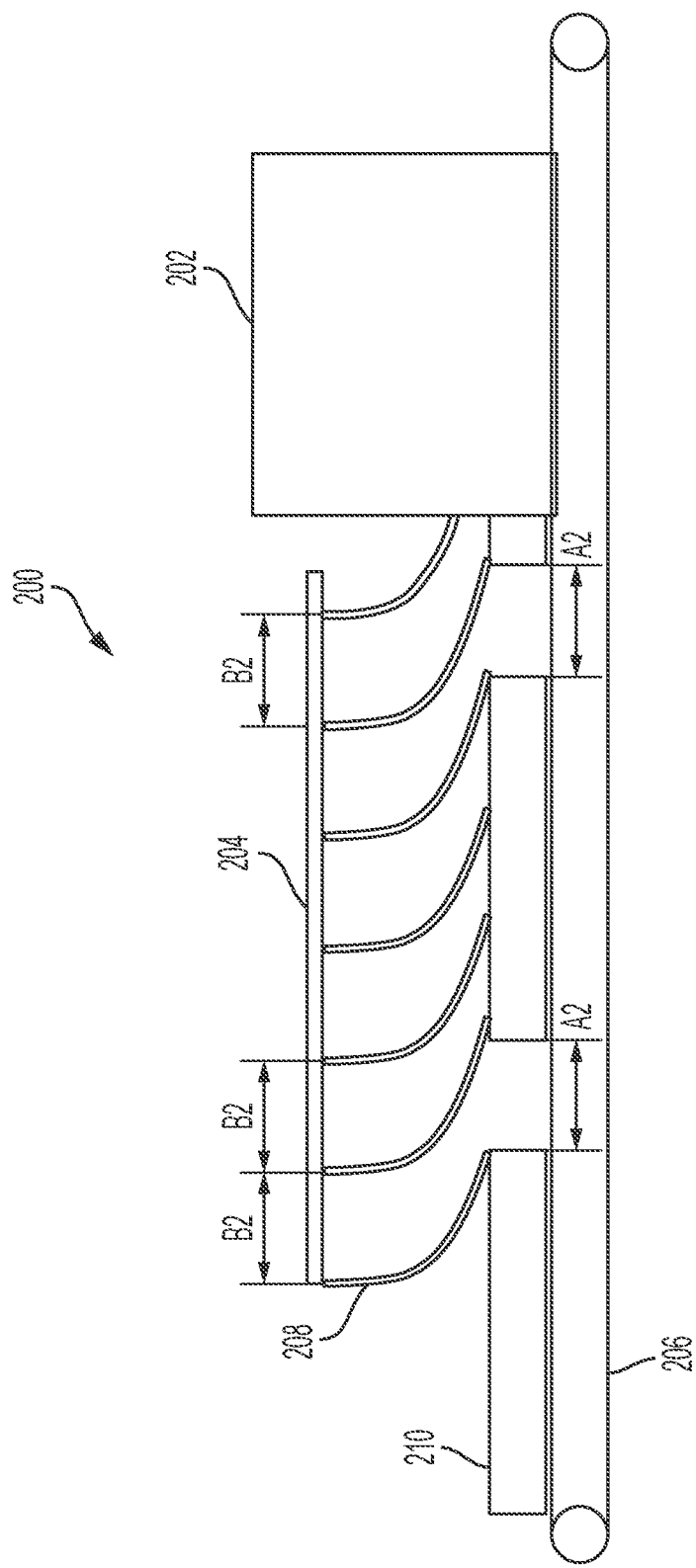
FIG. 2 is a side view of a scanning system, according to one aspect.

FIG. 2 shows an exemplary embodiment of a scanning system 200. The scanning system 200 comprises a shielding region 204 adjacent a radiation control area 202. A stream of articles 210 each separated by a gap A2 is moved by a conveyor 206 through the shielding region 204 to the radiation control area 202. The shielding region 204 comprises a plurality of curtains 208 that are arranged such that the stream of articles 210 passing through the curtains 208 holds open all of the curtains 208 at all times. If the spacing B2 between curtains 208 is on the order of the drop length, then by the time a curtain drops off a rear edge of a first article, the curtain is already being pushed up out of the way by a second article, into an open position. This may cause a percentage of time where at least one curtain is in down position to be zero. As noted above, the inventors have recognized and appreciated that it may be desirable, due to a scanning system having a high radiation level, to ensure that two or more curtains are arranged in a down position at all times.

Figure 3:
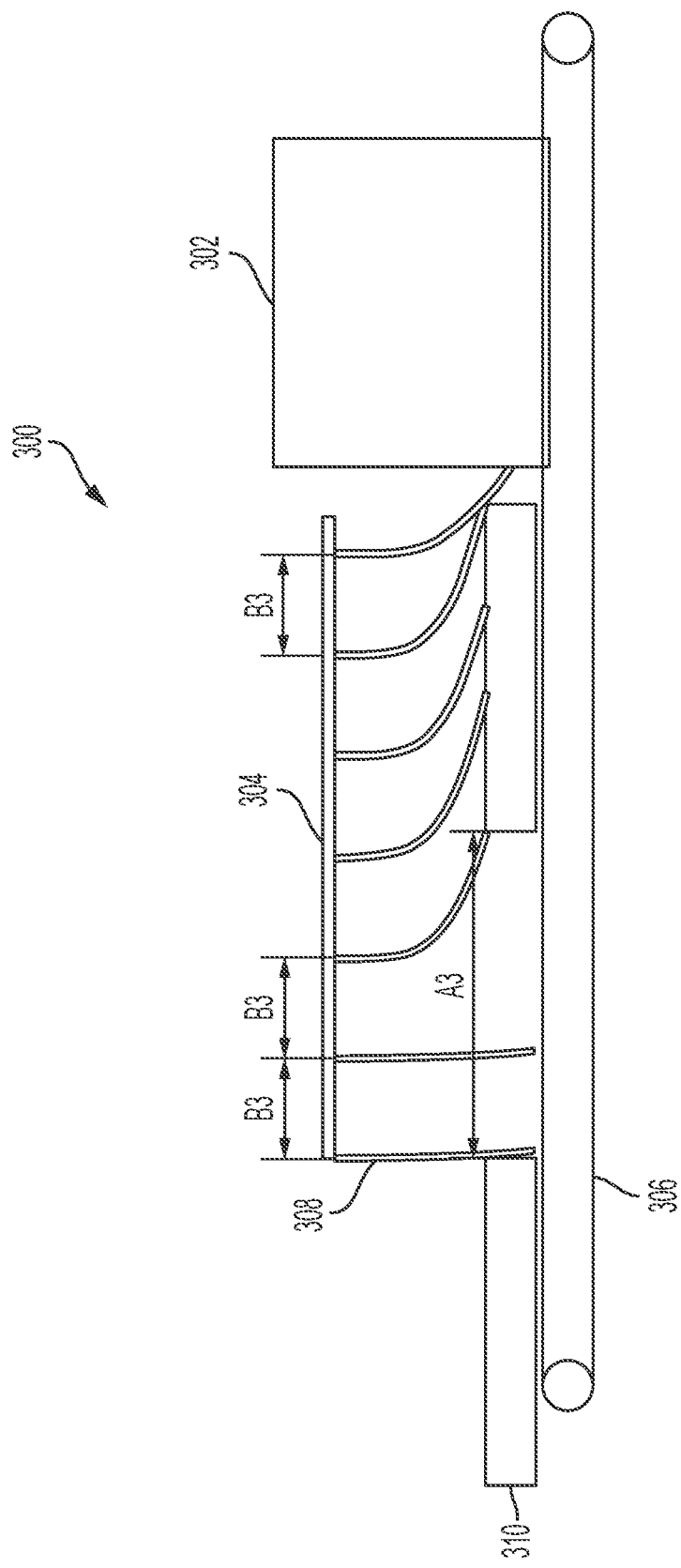
FIG. 3 is a side view of a scanning system, according to one aspect.

An exemplary embodiment of a scanning system 300 is shown in FIG. 3. The scanning system 300 comprises a shielding region 304 adjacent a radiation control area 302. A stream of articles 310 each separated by a gap A3 is moved by a conveyor 306 through the shielding region 304 to the radiation control area 302. The shielding region 304 comprises a plurality of curtains 308 each spaced at intervals of distance B3. In some embodiments, the distance B3 may be substantially 8 inches. In the illustrative embodiment, the drop length of the curtains may be substantially 10 inches. The curtains will typically drop once a rear edge of an article is more than the drop distance past the position of the curtain. In the illustrative embodiment, the articles are spaced having a gap of distance A3. In some embodiments, the distance A3 may be substantially 26 inches. In the illustrative embodiment of FIG. 3, a third curtain is configured to fall off of the rear edge of the first article, just as the first curtain is penetrated by the second article. Therefore, at least two curtains will be arranged in a down position at all times.

However, the inventors have recognized and appreciated that the required increased gap size of FIG. 3 reduces the throughput of articles to be scanned. For example, if each article has length of substantially 26 inches, a gap of substantially 26 inches is now required between the each article, each article has an effective length of substantially 52 inches. If there was a substantially 8 inch gap between articles, the effective article size would be substantially 34 inches. For example, for a scanner having a fixed speed, increasing the gap size from 8 inches to 26 inches such that effective article size increases from 34 inches to 52 inches, throughput may be reduced throughput by a ratio of 34/52 or 65%.

Figure 4:
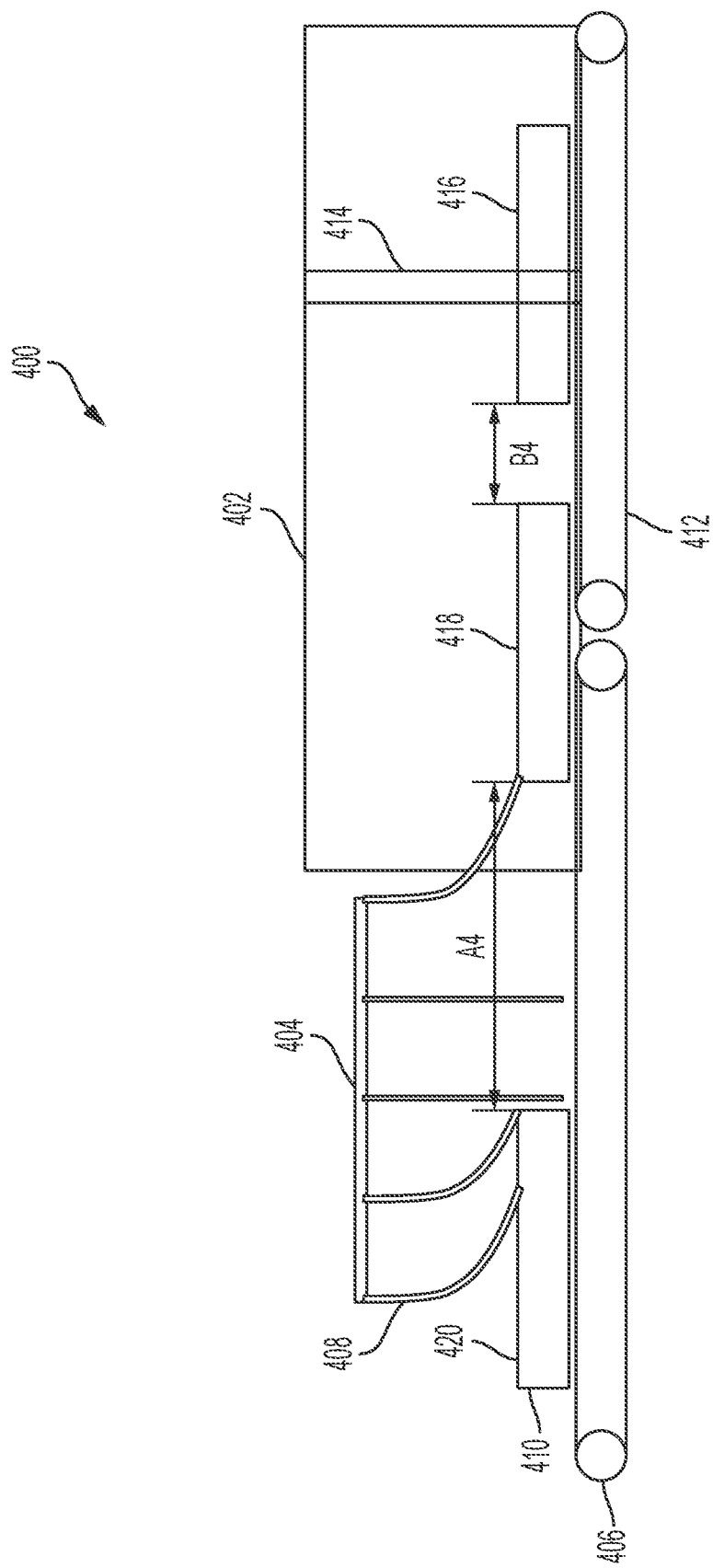
FIG. 4 is a side view of a scanning system, according to one aspect.

FIG. 4 shows an exemplary embodiment of a scanning system 400 with a segmented conveyor. The scanning system 400 comprises a shielding region 404 adjacent a radiation control area 402. A stream of articles 410 each separated by a gap is moved by a shielding conveyor 406 and an imaging conveyor 412 through the shielding region 404, to the radiation control area 402, and through an imaging region 414. The shielding region 404 comprises a plurality of curtains 408. In FIG. 4, a second article 418 hits a point where its speed drops as it is transferring from the shielding conveyor speed to the imaging conveyor speed at the point at which it drops the last curtain. Therefore, the gap between second article 418 and the third article 420 remains at distance A4 for the full time the gap is passing through the curtains. In some embodiments, the distance A4 may be substantially 26 inches as above. At this time, the gap between the second and the first article 416 has reduced to a gap of distance B4. In some embodiments, the distance B4 may be substantially 8 inches. At this time, both the first article 416 and the second article 418 are moving at a speed determined to be suitable for imaging. As the articles continue to move, the gap between the third article 420 and the second article 418 will decrease. However, because the second article 418 has already passed the final curtain, the shielding performance will not be affected by the decreased gap, and will function as if the gap remained constant. Such an arrangement may keep radiation emissions within acceptable ranges, while increasing the throughput of the scanning system relative to a scanning system with constant conveyor speed.

A configuration of a scanning system having multiple conveyor speeds may present some undesirable characteristics and/or tradeoffs. For example, such a scanning system requires having multiple conveyor segments, which may increase cost and complexity. Additionally, such as with the exemplary system shown in FIG. 4, some systems having multiple conveyor speeds require extra system length to ensure that a first article is out of the curtains before the gap between it and a following article begins to close. Excess system length is undesirable as it limits the locations where a system may be used. The inventors have recognized and appreciated that it is desirable to have a scanning system with similar throughput and radiation containment as the scanning system 400 in FIG. 4 but with decreased system length.

Figure 5A:
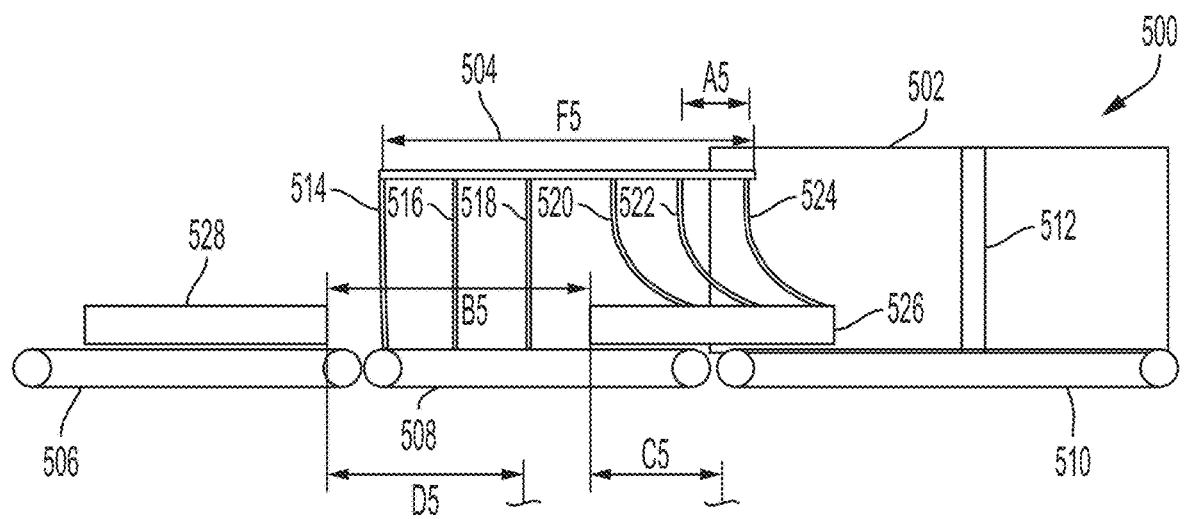
FIGS. 5A-C are side views of a scanning system, according to one aspect.
Figure 5B:
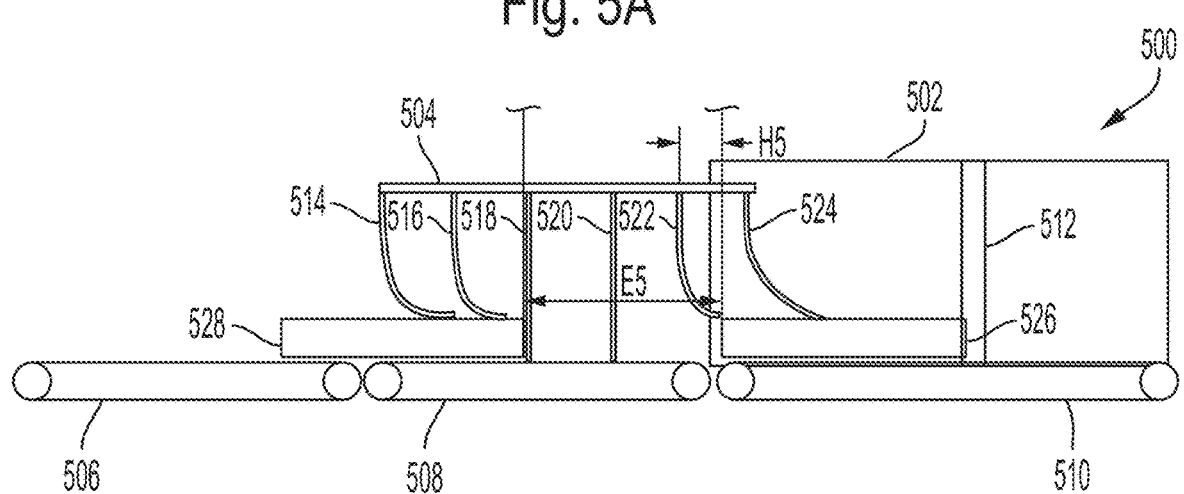
Figure 5C:
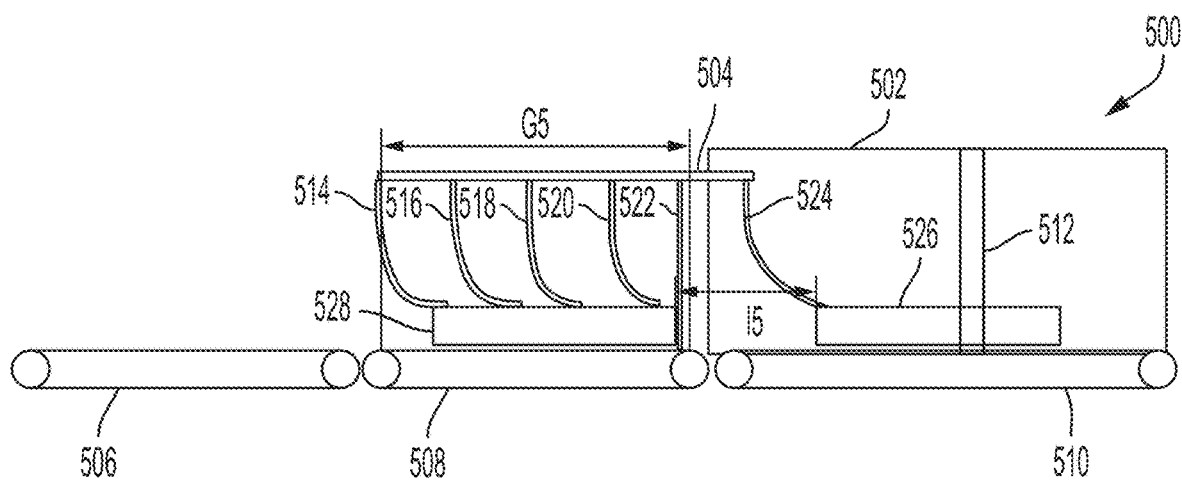

FIGS. 5A-C show an exemplary embodiment of a scanning system 500. The scanning system employs different conveyor speeds with a shortened entrance conveyor. A shielding conveyor may be run at 150% of the speed of the imaging conveyor. In the illustrative embodiment, the curtains are equally spaced and extend onto the scanning conveyor. The conveyors of scanning system 500 are segmented so that an imaging conveyor may be run at a required speed, but run conveyors corresponding to shielding curtains may be run at a faster speed. This results allows for the large gaps needed to ensure enough curtains will be down while articles are going through curtains. The gaps decrease in size as the articles move to the slower imaging conveyor (the slower speed ensuring images are not degraded). This arrangement reverses the reduction in throughput, but the reduced gap between articles, in combination with the constant curtain spacing results in only one curtain being down for a substantial portion of a scanning cycle.

The scanning system 500 comprises a shielding region 504 adjacent a radiation control area 502. A stream of articles including first article 526 and second article 528 are moved by a feed conveyor 506, shielding conveyor 508 and an imaging conveyor 510 through the shielding region 504, to the radiation control area 502, and through an imaging region 512. The shielding region 504 comprises first curtain 514, second curtain 516, third curtain 518, fourth curtain 520, fifth curtain 522, and sixth curtain 524.

In some embodiments, curtains may each comprise a single shielding layer. In some embodiments, the first curtain 514 and the sixth curtain may each comprise a double layer of shielding and the other curtains may each comprise a single layer of shielding.

The scanning system 500 of FIGS. 5A-C is an illustrative system having a shorter entrance distance than the scanning system 400. The curtains are distributed at locations evenly along the conveyors and are separated by gaps having a distance A5. In some embodiments, the distance A5 may be substantially 8 inches. In the illustrative embodiment, there are eight total layers of shielding. In the illustrative embodiment the first and sixth curtains 514 and 524 each have two layers of shielding and the other curtains each have one layer of shielding. The sixth curtain 524 overhangs the imaging conveyor 510. Similar to scanning system 400 described in relation to FIG. 4, when the configuration of scanning system 500 in FIGS. 5A-C is used with all conveyors at a matched speed (e.g., approximately 6 inches per second) and a predetermined article gap of distance B5, at least two curtains will be arranged in a down position at all times. In some embodiments, the distance B5 may be substantially 28 inches. In FIG. 5A, the third curtain 518 will fall before a following article lifts the first curtain 514. In a configuration having all conveyors running at a matched speed, the dynamic radiation emission measurement may be 60 microRem, well within most regulatory requirements. With an exemplary article size of substantially 26 inches, such a configuration would yield a throughput of about 400 articles per hour.

The conveyors may be run at different speeds to increase throughput as described above in relation to scanning system 400. Specifically, the feed and shielding conveyors 506 and 508 may be run at a faster speed than the imaging conveyor 510. For example, the imaging conveyor 510 may be run at a speed of approximately 6 inches per second (ips) and the entrance and feed conveyors may be run at a speed of 9 ips. In one example, an exemplary initial gap between first and second articles having a distance of 28 inches will decrease to a distance of 10 inches by the time the second article transitions to the speed of the scanning conveyor. The throughput of this configuration would be about 600 articles per hour, which is 50% more than the previously-described matched speed arrangement.

In FIG. 5A, the first article 526 is disposed at a speed transition point between a shielding conveyor 508 and a slower imaging conveyor 510, and starts moving at scan speed while still in curtains. The first article 526 and the second article 528 are separated by a gap of distance B5, which may be substantially 28 inches as noted above. The first article 526 on the imaging conveyor 510 is now traveling at as speed of 6 ips. The second article 528 is disposed on the feed conveyor 506 and is still traveling at an exemplary speed of 9 ips. At this time, three curtains are down, and two curtains (516 and 518) will remain down even when the second article 528 hits the first curtain 514 and lifts it.

In FIG. 5B, the first article 526 has moved distance C5. In some embodiments, the distance C5 may be substantially 14 inches. The second article 528 has moved distance D5. In some embodiments, the distance D5 may be substantially 21 inches. The gap between the first article 526 and the second article 528 has decreased to a distance of E5 due to the speed difference of conveyors. In some embodiments, the distance E5 may be substantially 21 inches. At the time that the second article 528 will lift the third curtain 518, the first article 526 is a distance H5, which may be substantially 4.50 inches, from the fifth curtain 522 and still has to move substantially another 3.5 inches before the fifth 522 curtain drops from a rear edge of the first article 526. At that time, only one curtain will be left in a down position.

In FIG. 5C, the first article 526 has moved to the point where the sixth curtain 524 is just about to drop. At the same time, the second article 528 is just about to lift the fifth curtain 522. The articles 526 and 528 are separated by a gap of distance I5 which is smaller than the previous gaps. In some embodiments, the distance I5 may be substantially 16 inches The shielding region 504 has a length of distance F5, which may be substantially 39.75 inches. In some embodiments, the distance may be about 40 inches, or less than 40 inches. In some embodiments, the length of a shielding region, such as shielding region 504, is set based on the length of a typical article plus the typical drop length, to ensure that a single article cannot hold all the curtains open at once. For example the length of a shielding region may be greater than a typical article length plus a typical drop length. In some embodiments, the shielding region may be formed by a first curtain and a final curtain. The first and final curtains may respectively be the first and final curtains an article moving through the scanning system passes through. As described above, it may be desirable to have a shorter overall system length. In some embodiments, having the shielding region at least partially overhang the scanning conveyor, and/or having a shorter conveyor allows for a shorter length of the shielding conveyor. The shielding conveyor may have a length of distance G5, which may be substantially 33.00 inches. These distances may be shorter relative to similar measurements of the scanning system 400.

Sizing of a shielding region can affect article spacing. Due to the shielding region 504 overhanging the scanning conveyor 510, the first article 526 will slow down relative to the second article 528 while still in the scanning region 504. This results in the gap between the articles shrinking while the first article 526 is still holding curtains open. FIG. 5C demonstrates that as the gap shrinks, only one curtain is fully down for a significant amount of time compared to the minimum of two layers in the matched speed case.

An experimental measurement was taken for one configuration of a scanning system constructed using similar materials and techniques as described in relation to FIGS. 5A-C. The measured system differs from scanning system 500 described in relation to FIGS. 5A-C in that the measured system comprises eight shielding layers arranged in seven equally spaced curtain locations, rather than the eight shielding layers arranged in six equally spaced curtain locations for scanning system 500 described in FIGS. 5A-C. The experimental measurement found a radiation emission measurement may be, for example, 101 microRem. This value exceeds some regulatory requirements. Using this exemplary configuration having a more practical reduced entrance tunnel length, and increasing the speed of articles through the shielding, and slowing them down for scanning increased the throughput by 50%, but also increased the radiation measurement by close to 70% resulting in an undesirable result.

The inventors have recognized and appreciated that while the system length of scanning system 500 is decreased from scanning system 400, and throughout is increased from scanning system 300, the radiation protection in this is undesirably decreased from scanning systems 300 or 400. The inventors have recognized and appreciated a need for a scanning system incorporating a decreased system length and increased throughput, while also maintaining a level of radiation containment similar to scanning systems 300 or 400.

Thus the inventors have recognized and appreciated a need for a scanning system having a high throughput of scanned articles while also regulating an acceptable level of radiation escaping the scanning system, and having a decreased system length. The inventors have further recognized problems with various existing conventional systems.

For example, the inventors have recognized that conventional scanning systems having a single speed conveying objects may require the large gap size needed for radiation control to be maintained through the scanning section, and that the large gap size significantly limits the throughput of articles to be scanned. The inventors have further recognized that conventional scanning systems having multiple conveyor speeds may have such large dimensions that they may not installed in existing scanning environments or they may occupy too much space in a scanning environment. The inventors have also recognized that conventional scanning systems having multiple conveyor speeds attempting to decrease the overall system length often result in a sacrifice of radiation control performance.

However, the inventors have recognized and appreciated an improved scanning system which provides a high throughput of articles, provides improved performance of radiation control, and has a smaller system length. The inventors have recognized and appreciated that curtains in a scanning system may be distributed along one or more conveyors, with consideration given to a changing gap length between two articles. The changing gap length may occur as the two articles progress along the conveyors, such as within a tunnel. The changing gap length may be a result of the one or more conveyors having two or more different speeds.

According to one embodiment, extra length on an input or shielding conveyor is eliminated, which results in a leading article having a decreased speed before leaving the region comprising curtains. As described above with respect to FIG. 5, a gap between the articles will decrease below a critical length required for the number of curtains desired to be down at all times, which may allow excess radiation to escape. In the exemplary embodiment of FIG. 5, the number of curtains desired to be down at all times is two, however, aspects of the present application are not limited in this manner, and as described above in relation to curtain sets, any desired number of curtains to be down may be chosen to suit a required level of radiation containment. Setting positions of curtains to offset may compensate for the decrease in gap size and may allow for sufficient containment of radiation while having a higher throughput of articles and a decreased system length.

Figure 6A:
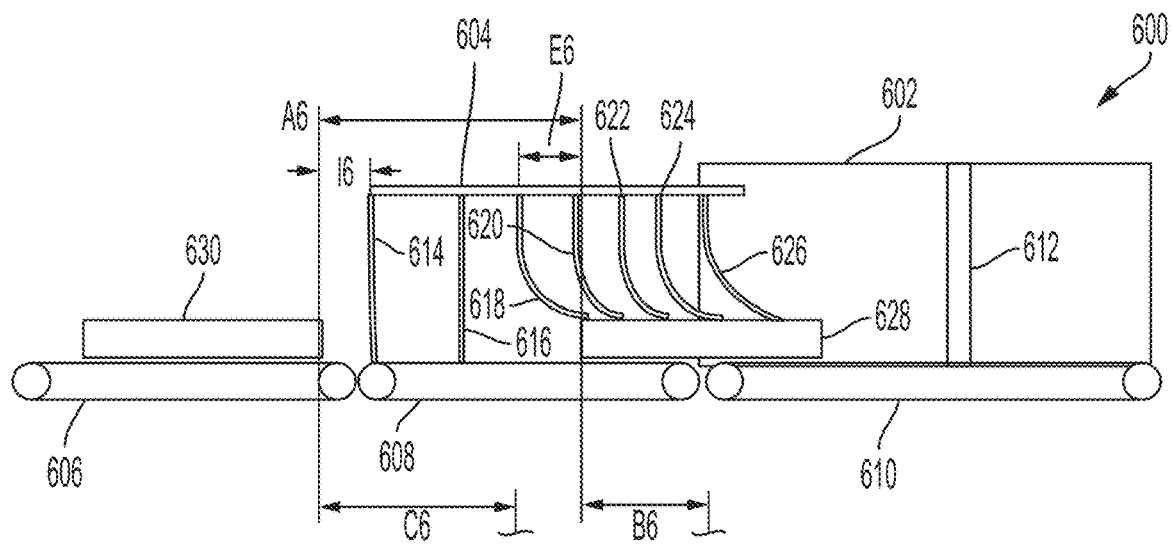
FIGS. 6A-C are side views of a scanning system, according to one aspect.
Figure 6B:
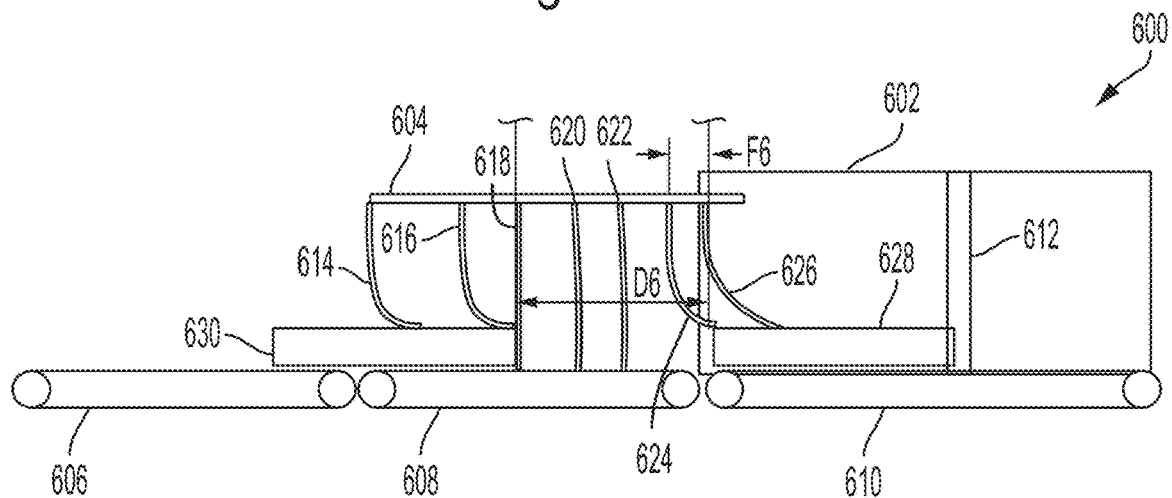
Figure 6C:
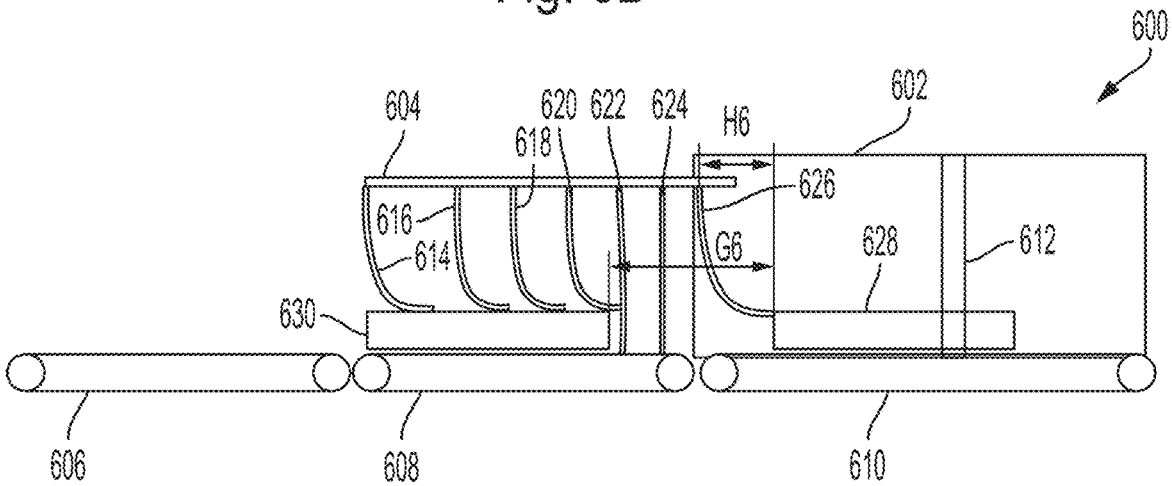

FIGS. 6A-C shows a scanning system 600 comprising an improved arrangement of curtain placement. Scanning system 600 provides a high throughput of scanned articles, decreased escaping radiation, and a decreased system length. The scanning system 600 comprises a shielding region 604 adjacent a radiation control area 602. A stream of articles including first article 628 and second article 630 are moved by a feed conveyor 606, shielding conveyor 608 and an imaging conveyor 610 through the shielding region 604, to the radiation control area 602, and through an imaging region 612. The shielding region 604 comprises first curtain 614, second curtain 616, third curtain 618, fourth curtain 620, fifth curtain 622, sixth curtain 624, and seventh curtain 626.

In FIG. 6A-C, curtains are arranged at improved locations. The exemplary embodiment of FIG. 6A-C includes eight total layers of shielding disposed at seven locations. In the exemplary embodiment, curtains are arranged so that there is a double layer of shielding in the first curtain 614 at a first distance illustrated as substantially 0 inches, as well as single layers of shielding at each of a second curtain 616 at a second distance illustrated as substantially 10 inches, a third curtain 618 at a third distance illustrated as substantially 16 inches, a fourth curtain 620 at a fourth distance illustrated as substantially 22 inches, a fifth curtain 622 at a fifth distance illustrated as substantially 27 inches, a sixth curtain 624 at a sixth distance illustrated as substantially 31 inches, and a seventh curtain 626 at a seventh distance illustrated as substantially 36 inches. Each of the distances is arranged relative to a leading position defined by the first curtain 614 that an article traveling on the conveyors will contact. In some embodiments, curtains may be arranged in an outer half and an inner half of the shielding region, relative to a radiation control area. The average gap between curtains in the outer half of the shielding region may be more than the average gap between curtains in the inner half of the shielding region.

There may be gaps between consecutive curtains. The curtains and gap may be arranged such that no curtain is disposed on a gap. A first gap between arranged more proximate to the leading position than a second may be larger than the second gap. For example, in the FIGS. 6A-C, the gap size decreases or stays the same size except for a final gap. In the figure, a first gap formed by first and second curtains 614 and 616 is substantially 10 inches, a second gap formed by second and third curtains 616 and 618 is substantially 6 inches, a third gap formed by third and fourth curtains 618 and 620 is substantially 6 inches, a fourth gap formed by fourth and fifth curtains 620 and 622 is substantially 5 inches, a fifth gap formed by fifth and sixth curtains 622 and 624 is substantially 4 inches, and a sixth gap formed by sixth and seventh curtains 624 and 626 is substantially 5 inches. A drop length of substantially 8 inches is again used for illustrative purposes.

In some embodiments, the gap distance between curtains may be arranged according to the following. As a first and second article move through the scanning system 600, the distance of a gap between the articles decreases. As shown in FIGS. 6A-C, the coordinates of each curtain of at least two pairs of curtains are arranged between the first and second article at all times. The coordinate of a curtain may refer to the position of the curtain in a non-deployed arrangement, or to the position of a fixed portion of the curtain (e.g., a portion of the curtain affixed to the top of a tunnel). The article gap can be configured so that it is larger than the summation of: (1) a first separation distance of a first pair of curtains, (2) a separation distance of a second pair of curtains and (3) a drop length of the leading article. The above-referenced first and second pairs of articles refer to the three curtains comprising two pairs of curtains, each of whose coordinate is disposed, at any particular instant, between the pair of articles. The curtain spacing can be configured such that this rule is satisfied at all times.

The feed and shielding conveyors 606 and 608 may be run faster than the imaging conveyor 610. For example, the feed and shielding conveyors 606 and 608 may be run up to 50%, e.g., 50%, faster than the imaging conveyor 610. Imaging conveyor speed may be determined based on a desired scanner performance. In one embodiment, the imaging conveyor 610 may be run at a speed of 6 ips and the feed and shielding conveyors 606 and 608 may be run at a speed of 9 ips.

In FIG. 6A, a first article 628 is disposed at a speed transition point, transferring from a shielding conveyor 608 to an imaging conveyor 610, and starts moving at scanning speed while still disposed in the scanning region 604 comprising the curtains. In FIG. 6A, the gap between the first article 628 and the second article 630 is still the initial gap having a distance of A6, as the first article 628 has not yet experiences the effect of a changed speed. In the exemplary embodiment, the distance A6 in substantially 28 inches. When the first article 628 is disposed at the transition point of the shielding conveyor 608 and imaging conveyor 610, as illustrated in FIG. 6A, two curtains, the first 614 and second 616, are arranged in a down position. The first article 628 is a distance E6, illustrated as substantially 6.5 inches beyond the third curtain 618, and as such, using the 8 inch drop length, the third curtain will drop when the first article moves substantially another 1.5 inches. The second article 630 has not yet reached the first curtain 614 to lift it, and is still a distance of I6 away. In some embodiments, the distance I6 may be substantially 5.75 inches.

In FIG. 6B the first article 628 has moved a distance B6, illustrated as substantially 14 inches, the second article 630 has moved a distance C6, illustrated as substantially 21 inches, and the gap between the articles has decreased to a distance D6, illustrated as substantially 21 inches. As the second article 630 lifts the third curtain 618, two curtains will remain fully down. The first article 628 will drop the sixth curtain 624 before the second article 630 reaches the fourth curtain 620. The first article 628 is the distance F6, illustrated as substantially 5.5 inches, from the position of the sixth curtain 624 and is therefore still substantially 2.5 inches from releasing the sixth curtain 624, at which point the second article has not yet have reached the fourth curtain. For the time period from when the sixth curtain 624 is dropped until the fourth curtain 620 is lifted, three curtains, the fourth 620, the fifth 622 and the sixth 624, are down. and at least two curtains remain down.

In FIG. 6C, the first article 628 is disposed at a point where the seventh curtain 626 will drop (e.g., a drop distance H6). In some embodiments, the distance H6 may be substantially 8 inches. The second article 630 is not yet at the fifth curtain 622. Two curtains remain fully down. The gap between the first and second article has decreases to a distance G6, illustrated as substantially 17.75 inches.

Using the conveyor speeds described above for FIG. 6, an increased throughput rate of about 600 articles per hour is achieved, which is similar to the throughput achieved by the scanning systems and 500. Scanning system 600 may be constructed having a similar arrangement as scanning system 500, with a difference being the arrangement of curtains and gaps. For example, the scanning system may have similar length of the shielding region and/or similar length of shielding belt as scanning system 500. Thus, scanning system 600 may have a similar decreased system length as scanning system 500. However, the arrangement of curtains of the scanning system in FIG. 6 ensures that at least two curtains are always down, similar to a matched speed case, the improved system of FIG. 6A-C produces a lower radiation emission rates than conventional systems such as in FIG. 5 with a similar reduced length.

An experimental test was performed using a similar curtain layout to FIG. 6. The dynamic radiation reading was 83 microRem. As noted above, for a scanning system constructed using eight shielding layers arranged in seven equally spaced curtain locations, an experimental measurement found a radiation emission measurement to be 101 microRem, exceeding some regulatory requirements. The inventors have recognized that a configuration with unequally spaced curtains, such as scanning system 600 in FIGS. 6A-C, uses the same number of shielding layers and a similar shielding region length, as the scanning system with equally spaced curtains, such as system 500 in FIGS. 5A-C, but produced a substantially 20% reduction in radiation emission. This improved reading is safely within the requirements of most regulators.

Curtain placement and arrangement may be improved or optimized based on: a level of radiation containment desired, which may determine a number of curtains that need to be down; a ratio of speeds of a shielding conveyor and a imaging conveyor; and the distance from an outermost curtain to a point at which a typical article drops from the shielding conveyor speed to the imaging conveyor speed.

In one approach to improving or optimizing performance, an experiment may be run to determine an accumulated radiation dose for a stream of articles with a fixed gap of a particular length between them. The experiment may be repeated for several different article to article gap sizes to provide data needed to develop an equation for estimating the effect of different numbers of curtains being down. For example, the data in Table I was obtained.

TABLE I

Rate of Radiation Output by Gap Length, Default Machine Setup

| Gap (Inches) | Radiation (microRem per hour, μR/hr) |
|---|---|
| 28 | 52.94 |
| 21 | 101.41 |
| 15 | 213.16 |

Table I describes radiation rates observed for various gap lengths.

Using known configurations of curtains and the distance a typical article must be beyond a curtain for that curtain to fall, the fraction of time that a given number of curtains is down for each gap measured above may be estimated. First, a cycle may be defined as the time from when an article first touches the first curtain to the point in time where the next article first touches the first curtain. Next, three typical length articles are considered, approaching the first curtain and each gapped by the chosen test gap. A simple model of the articles moving through the curtains is used. The simple model tracks how many curtains are currently held open by the first article, based on drop length (i.e., how far past a curtain a typical article must move before a curtain will drop). Once the model has advanced to where the second article has reached the first curtain, the model is advanced to critical points, for example where curtains start to rise or fall. How many curtains are fully down for the various time segments is tracked. The model continues until the third article reaches the first curtain. The fraction of a cycle for which each given number of curtains are down may then be calculated.

TABLE II

| Proportion of Cycle "n" Curtains are Down, by Gap | | | | | | | | | |
|---|---|---|---|---|---|---|---|---|---|
| Gap | 0 | 1 | 2 | 3 | 4 | 5 | 6 | 7 | 8 |
| 28 | 0 | 0 | 0.297 | 0.444 | 0.259 | 0 | 0 | 0 | 0 |
| 21 | 0 | 0.255 | 0.404 | 0.213 | 0.128 | 0 | 0 | 0 | 0 |
| 15 | 0.122 | 0.683 | 0.049 | 0 | 0.146 | 0 | 0 | 0 | 0 |

Table II describes results of simple model estimating fraction of time given numbers of curtains are down based on gaps measured above.

Table II shows the results of such a model for 26 inch articles, a drop length of 10 inches and eight total layers of shielding disposed at six locations with 8 inch gaps in between positions. There are two layers at a first position and two layers at a last position. When running with a gap of 28 inches the simple model indicates there were never less than two curtains down and 26% of the time 4 curtains are down. When running with a 21 inch gap, four curtains were down only 13% of the time, while 25% of the time only one curtain was down.

Radiation shielding effects are multiplicative. That is, if one layer of curtains reduces the radiation to 30% of the initial reading, two layers will reduce it to $(30\%)^2$ or 9%. Similarly, 4 layers would reduce it to $(30\%)^4$ or 0.8%. Given that, the following equation may be used to estimate the radiation effect a given cycle with a mixed number of curtains down.

$$R_F = b + R_I \Sigma T_n r^n \qquad \text{Equation 1:}$$

Where $T_n$ is the fraction of time n curtains are down, r is the attenuation of one layer of curtains, $R_I$ is the initial radiation and b is the background radiation. Using the values from Table I and Table II with Equation 1, the following equations may be found.

$$52.94 = b + R_I(0.297r^2 + 0.444r^3 + 0.259r^4) \qquad \text{Equation 2:}$$

$$101.41 = b + R_I(0.255r + 0.404r^2 + 0.213r^3 + 0.128r^4) \qquad \text{Equation 3:}$$

$$213.16 = b + R_I(0.122 + 0.683r + 0.049r^2 + 0.146r^4) \qquad \text{Equation 4:}$$

The Equations 2, 3, and 4 can be put in an equation solver. The results yield: b≈17, r≈0.38, and $R_I$≈500. In some instances, the radiation reading for zero curtains down is much higher than 500 microRem but this simple model may provide good estimates for the effect of different curtain configurations.

For use with a scanning system similar to scanning system 600, the previous model may be modified for article movement to address a decreasing gap distance once a first article changes speed once it hits the slower scanning conveyor. For example, once the nose of an article has passed the point between the conveyor segments by a fixed amount, e.g., half the typical article length, the fraction of time that various curtain numbers are down for any given curtain configuration may be obtained.

These values may be used with the above experimentally-derived equation to provide an estimate of effectiveness for a given configuration of curtains. With the modified model and the experimentally derived equation, an improved or best curtain arrangement, i.e., that produces the lowest $R_F$ value for a given set of conveyor speeds, a given number of curtain layers, and/or a given drop length may be determined.

When shielding conveyors have higher speeds than the scanning conveyors, gaps between the outermost curtains will generally be larger, and the gaps will decrease towards the slower conveyor.

As should be appreciated from the forgoing, the aspects of the present application may provide a method of scanning a plurality of articles. For example, scanning system 600 may provide a method of scanning articles.

Figure 7:
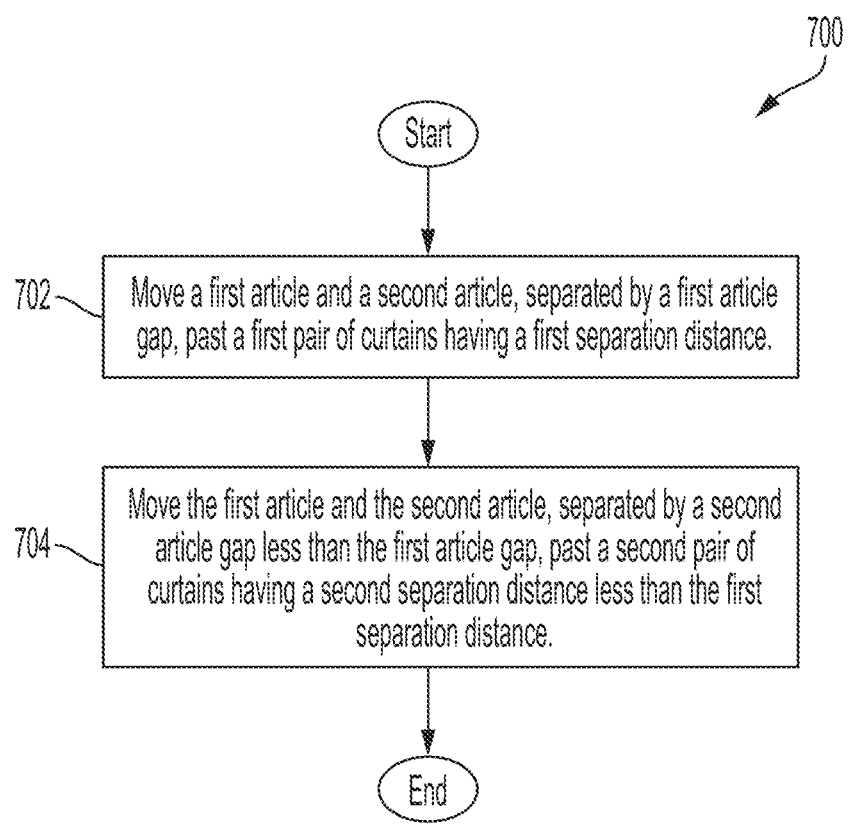
FIG. 7 is an example process flow of scanning a plurality of articles.

FIG. 7 shows a process 700 related to a scanning system such as scanning system 600. According to some embodiments, at act 702, the method comprises moving a first article and a second article separated by a first article gap, past a first pair of curtains having a first separation distance.

According to some embodiments, the method comprises, at act 704, moving the first article and the second article, separated by a second article gap less than the first article gap, past a second pair of curtains having a second separation distance less than the first separation distance.

According to some embodiments, the method may further comprise moving the article through a radiation control area and/or an imaging region. The method may further comprise moving a stream of articles through the system such that at least two curtains are arranged in a down position at all times. The method may further comprise moving the articles past each curtain, each pair of curtains, and each respective gap.

Modifications and variations of the discussed embodiments will be apparent to those of ordinary skill in the art and all such modifications and variations are included within the scope of the appended claims. For example, while aspects of the present application are described as applied to an entrance to a scanning system, they may similarly be applied to an exit of a scanning system. When aspects of the present application are applied to an exit of a scanning system, the arrangement of curtains and/or conveyors may be reversed. That is to say, the article may travel from the slower imaging conveyor to a faster exit conveyor, passing through curtains having increasing gap distances. An exit conveyor may comprise a shielding conveyor and thus be arranged according to techniques described with respect to shielding conveyors such as entrance conveyors. In some embodiments, a scanning system has an entrance shielding conveyor, a scanning conveyor, and an exit shielding conveyor. The entrance and exit conveyors may have substantially the same speed, and/or may have a speed greater than the scanning conveyor.

Figure 8:
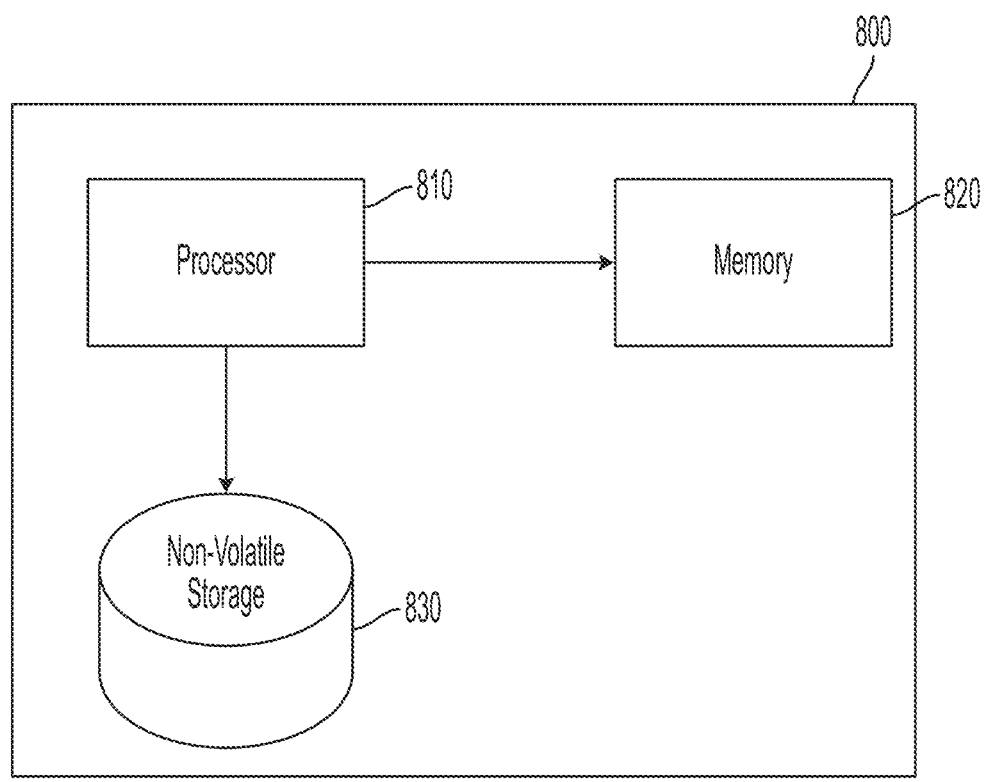
FIG. 8 is a block diagram of a computer system on which various functions can be implemented

Additionally, an illustrative implementation of a computer system 800 that may be used in connection with any of the embodiments of the disclosure provided herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner. To perform any of the functionality described herein (e.g., image reconstruction, anomaly detection, etc.), the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIG. 7) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A scanning system accommodating a radiation source, the scanning system comprising:
 a plurality of curtains comprising:
  a first pair of curtains having a first separation distance; and
  a second pair of curtains having a second separation distance less than the first separation distance, the second pair of curtains being arranged more proximate to the radiation source than the first pair of curtains; and
 a plurality of conveyors configured to move articles to be scanned past the plurality of curtains and past the radiation source, the plurality of conveyors comprising:
  a first conveyor configured to move the articles at a first speed; and
  a second conveyor configured to:
   receive the articles after the articles are moved by the first conveyor; and
   move the articles at a second speed different than the first speed;
 wherein, for articles having a length of at least substantially 26 inches, arranged at an initial gap distance of at least 26 inches, at least two curtains of the plurality of curtains are arranged in a deployed position at all times; and the plurality of curtains comprises a first curtain and a final curtain arranged about 40 inches apart.

2. The scanning system of claim 1, wherein the plurality of conveyors are configured to:
move articles first past the first pair of curtains and then past the second pair of curtains; and
the second speed is less than the first speed.

3. The scanning system of claim 2, wherein the first conveyor is arranged at least partially in a shielding region and the second conveyor is configured to move the article through an imaging region formed at least in part by the radiation source.

4. The scanning system of claim 1, wherein the plurality of conveyors are configured to:
move articles first past the second pair of curtains and then past the first pair of curtains; and
the first speed is less than the second speed.

5. The scanning system of claim 4, wherein the second conveyor is arranged at least partially in a shielding region and the first conveyor is configured to move the article through an imaging region formed at least in part by the radiation source.

6. The scanning system of claim 1, wherein the first pair of curtains are constructed and arranged with the first separation distance;
the second pair of curtains are constructed and arranged with the second separation distance; and
the first separation distance added with the second separation distance added with a drop distance is less than a gap between a first article and a second article of the articles to be scanned.

7. The scanning system of claim 1, wherein there is a minimum first number of curtains to be in a down position at all times,
the plurality of curtains comprises:
a first set of curtains comprising:
a second number of curtains that is equal to the first number of curtains;
a first curtain and a final curtain; and
a curtain following the final curtain of the set of curtains; and
a separation distance between the first and final curtains, added with a separation distance between the final curtain and the following curtain, added with a drop distance is less than a gap between a first article and a second article of the articles to be scanned.

8. The scanning system of claim 1, wherein the scanning system is configured to scan at least 600 articles per hour.

9. The scanning system of claim 1, wherein the first pair of curtains comprises a first curtain and a second curtain; and
the second pair of curtains comprises the second curtain and a third curtain.

10. The scanning system of claim 1, wherein the first pair of curtains comprises a first curtain and a second curtain; and
the second pair of curtains includes a third curtain and a fourth curtain.

11. The scanning system of claim 1, wherein one of the curtains of the first pair of curtains comprises a first curtain;
one of the curtains of the second pair of curtains comprises a second curtain disposed between the first curtain and the radiation source; and
the second curtain comprises a single layer of shielding and the first curtain comprises a double layer of shielding.

12. The scanning system of claim 1 wherein the plurality of curtains further comprises a second curtain, a third curtain, a fourth curtain, and a fifth curtain;
wherein the first curtain, the second curtain, the third curtain, the fourth curtain, and the fifth curtain are arranged sequentially along the plurality of conveyors.

13. The scanning system of claim 1, further comprising a third pair of curtains and a fourth pair of curtains;
wherein the plurality of conveyors are configured to move the articles sequentially past the first, second, third, and fourth pairs of curtains;
the third pair of curtains have a third separation distance;
the fourth pair of curtains have a fourth separation distance;
the third separation distance is less than or equal to the second separation distance; and
the fourth separation distance is greater than the third separation distance.

14. The scanning system of claim 1, further comprising:
the radiation source, the radiation source comprising an emitter; and
a detector, the emitter and detector being configured to scan articles.

15. A method of scanning a plurality of articles comprising:
moving a first article and a second article, separated by a first article gap, past a first pair of curtains having a first separation distance; and
moving the first article and the second article, separated by a second article gap less than the first article gap, past a second pair of curtains having a second separation distance less than the first separation distance;
wherein the articles have a length of at least 26 inches and the first article gap is at least 26 inches,
wherein the method further comprises maintaining at least two curtains in a deployed position at all times, and a first curtain and a final curtain are arranged about 40 inches apart.

16. The method of claim 15, wherein the first pair of curtains are constructed and arranged with the first separation distance;
the second pair of curtains are constructed and arranged with the second separation distance; and
the first separation distance added with the second separation distance added with a drop distance is less than an article gap.

17. The method of claim 15, further comprising scanning the first article in an imaging region formed at least in part by a radiation source.

18. A scanning system accommodating a radiation source, the scanning system comprising:
a plurality of curtains comprising:
a first pair of curtains having a first separation distance; and
a second pair of curtains having a second separation distance less than the first distance, the second pair of curtains being arranged more proximate to the radiation source than the first pair of curtains; and
a plurality of conveyors configured to move articles to be scanned past the plurality of curtains and past the radiation source, the plurality of conveyors comprising:
a first conveyor configured to move the articles at a first speed; and
a second conveyor configured to:
receive the articles after the articles are moved by the first conveyor; and
move the articles at a second speed different than the first speed;
wherein one of the curtains of the first pair of curtains comprises a first curtain;

one of the curtains of the second pair of curtains comprises a second curtain disposed between the first curtain and the radiation source; and the second curtain comprises a single layer of shielding and the first curtain comprises a double layer of shielding.

* * * * *